United States Patent [19]

Hahn et al.

[11] Patent Number: 4,732,542
[45] Date of Patent: Mar. 22, 1988

[54] LARGE AIRFOIL STRUCTURE AND METHOD FOR ITS MANUFACTURE

[75] Inventors: Michael Hahn, Ottobrunn; Franz Sperber, Kolbermoor, both of Fed. Rep. of Germany

[73] Assignee: Messerschmitt-Bölkow-Blohm Gesellschaft mit beschränker Haftung

[21] Appl. No.: 885,239

[22] Filed: Jul. 14, 1986

Related U.S. Application Data

[63] Continuation of Ser. No. 700,335, Feb. 12, 1985, Pat. No. 4,643,646, which is a continuation of Ser. No. 361,840, Mar. 25, 1982, abandoned.

[30] Foreign Application Priority Data

Apr. 1, 1981 [DE] Fed. Rep. of Germany ....... 3113079

[51] Int. Cl.[4] .................................. B64C 11/26
[52] U.S. Cl. ................... 416/226; 416/230; 416/241 A
[58] Field of Search .............. 416/223, 226, 229, 230, 416/232, 233, 241 A; 156/156; 220/444

[56] References Cited

U.S. PATENT DOCUMENTS

| 2,574,980 | 11/1951 | Meyers | 416/226 |
|---|---|---|---|
| 2,580,363 | 12/1951 | Schnitt | 416/226 |
| 2,659,444 | 11/1953 | Stanley | 416/229 UX |
| 2,963,094 | 12/1960 | Cantineau | 416/226 |
| 3,055,437 | 9/1962 | Stack | 416/241 A |
| 3,217,807 | 11/1965 | Underhill, Jr. | 416/226 |
| 3,321,019 | 5/1969 | Dmitroff | 416/229 |
| 3,330,550 | 7/1967 | Brownlee | 416/223 |
| 3,519,228 | 7/1970 | Windecker | 416/229 |
| 4,095,322 | 6/1978 | Scarpati et al. | 416/226 X |
| 4,389,162 | 6/1983 | Doellinger et al. | 416/226 X |

FOREIGN PATENT DOCUMENTS

| 458312 | 12/1936 | France | 416/226 |
|---|---|---|---|
| 1009798 | 6/1952 | France | 416/226 |
| 2186380 | 7/1984 | France | . |
| 1003515 | 3/1952 | United Kingdom | 416/226 |
| 818403 | 8/1959 | United Kingdom | 416/229 |

Primary Examiner—Robert E. Garrett
Assistant Examiner—Joseph M. Pitko
Attorney, Agent, or Firm—Toren, McGeady & Associates

[57] ABSTRACT

An airfoil particularly suited for use in rotor blades of large wind-driven power plants is formed in three modular sections including a nose or leading section, a spar section and a trailing section, each separately formed and subsequently assembled. In the method of the invention the spar section is formed in two separate mold units which are configured to form part of the upper and lower aerodynamic profile of the airfoil and the two spar section units are trimmed along a junction plane and then joined together at the junction plane to form the spar section of the airfoil.

7 Claims, 14 Drawing Figures

LARGE AIRFOIL STRUCTURE AND METHOD FOR ITS MANUFACTURE

This is a continuation of application Ser. No. 700,335 filed Feb. 12, 1985, now U.S. Pat. No. 4,643,646, which is a continuation of application Ser. No. 361,840 filed Mar. 25, 1982, now abandoned.

The present invention relates generally to the structure and configuration of large airfoils and to a method of making a relatively large airfoil. More particularly, the invention is directed toward the construction of large airfoils of the type which may be used as the rotor blades of large wind-driven power plants.

In development work involving the construction and development of large airfoils, it has been attempted to apply a manufacturing method utilizing foam core supported molded sections in the formation of wings, rotor blades, and the like wherein the airfoils involve large linear lengths and extension of the width thereof. Such manufacturing methods involve the utilization of molds which cannot be closed. A particular method of the type discussed involves an operation wherein a shell of a molded section is laminated and hardened in two separate section halves of composite fiber material. A foam core is manufactured and processed directly in each shell of the mold section and after preparation of a junction plane of the molded section halves, the halves are glued together.

Furthermore, optional procedures which may be involved in such a method include providing the mold-release section with nose reinforcements and end edge reinforcements and manufacturing the foam core to be pressure resistant and so as to be used as plate material which is glued together. The plate material of the foam core is connected with the shell by means of form adhesive.

In a parallel of the application of the techniques discussed above, a rotor blade or component, particularly a blade root, which has a large surface is formed with a shell of fiber-reinforced plastic which is supported by a foam core. Disc-shaped positive formers of the blade contour are inserted into the support core, in accordance with this technique.

Particularly in the technique first mentioned above, known methods for the manufacture of foam core supported molded sections can no longer be used in practical applications where there are involved very large airfoils, such as the rotor blades of wind-driven power plants which may, for example, have a length of 70 meters and a section depth of about 7 meters. In a known rotor for large wind-driven power plants, the rotor is formed as a two-blade rotor having a diameter of 100.4 meters with a steel spar which is in turn encased by molded glass fiber sections which give the rotor its aerodynamic profile.

It is therefore the aim of the present invention to create a large aerodynamic wing or airfoil which is relatively easy to manufacture and easy to handle and which will also exhibit the characteristics of relatively high stiffness ratios (strength) to mass.

SUMMARY OF THE INVENTION

Briefly, the present invention may be described as an airfoil structure particularly suited for use with rotor blades of large wind-driven power plants wherein the airfoil is formed of three modular sections which consist essentially of a nose or leading section, an intermediate spar section, and a trailing section, the modular sections being separately formed and subsequently assembled together to form the airfoil. In the method of manufacture of the present invention, the spar section is formed in two parts in separate molds. Each of the molds forms one of the spar section parts with a portion of the upper and lower aerodynamic profile of the airfoil. In the molds, the spar section parts are trimmed along a junction plane and then the two parts are joined together at the junction plane in order to form the spar section of the airfoil.

Subsequently, the preformed leading and trailing sections of the airfoil are assembled with the spar section in order to complete the airfoil structure.

The advantages of a large airfoil in accordance with the present invention particularly involve the fact that spar flanges of the spar sections may be formed to lie at the maximum possible distance in relation to the neutral axis of the airfoil so that an optimum ratio of stiffness to mass may result.

The spar section is formed so as to define the central portions of the upper and lower profiles of the airfoil or wing and as a result no additional casings are required thereby further reducing the mass of the structure.

The nose section may be manufactured in one piece and may therefore be formed with good aerodynamic characteristics. Furthermore, the trailing sections of such an airfoil structure may be formed to be self-supporting and uniform. The entire airfoil will have a very high ratio of stiffness to mass and the separate manufacture of the section modules simplifies transportion of the airfoil to the site at which it is to be used, since the airfoil may be transported in smaller separate modular sections which may then be assembled at the site to form the airfoil.

The trailing section may be comprised of an upper and a lower half which may be formed as lightweight laminar structures and the leading or nose shell or section and the trailing section may both be provided with elastic longitudinal extensions which will enhance the assembly of the leading and trailing sections with the spar sections. The elastic extensions which may be constructed as thin laminar layers will operate to compensate for minor inaccuracies during assembly of the leading and trailing sections and will therefore facilitate assembly of the sections with the central spar section.

Screw connections may be provided in addition to glued connections in order to increase during the gluing operation the contact pressure in order to also counteract any peeling.

The spar section segments may be formed at disconnecting points with longitudinal bores and transverse bores in order to enable receipt of connecting elements. Therefore, special assembly techniques may be utilized.

Materials which may be particularly suitable for use with the present invention include PVC foam which is recommended for the foam bar unit of the spar section because it distinguishes itself by characteristics involving high dynamic strength. However, it does not foam freely. A unidirectional laminate of glass or carbon may be utilized for the flange laminate and glass fiber fabrics may be utilized for the remaining laminates.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
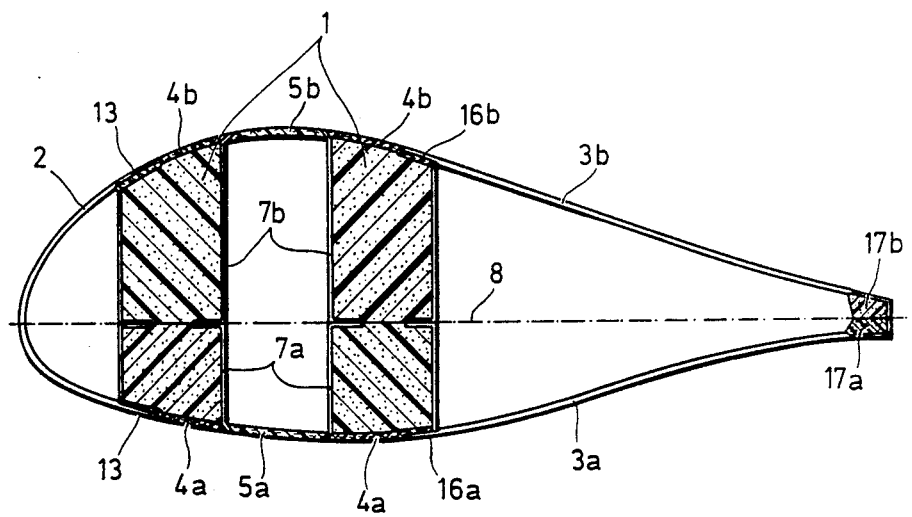
FIG. 1 is a sectional view of an airfoil structure in accordance with the present invention.

The structure of the airfoil constructed in accordance with the present invention is shown in section in FIG. 1. As will be noted from FIG. 1, the airfoil is divided into three modular sections which comprise a spar section 1, a nose or leading section or shell 2, and a trailing or vane section 3. In accordance with the present invention, each of these sections is formed as a separate modular unit and then assembled together, in a manner to be more fully described hereinafter. In very large wings or airfoils, also disconnecting points may be established in the longitudinal direction of the blade or airfoil (compare below FIGS. 5a and 5b).

Figure 2A:
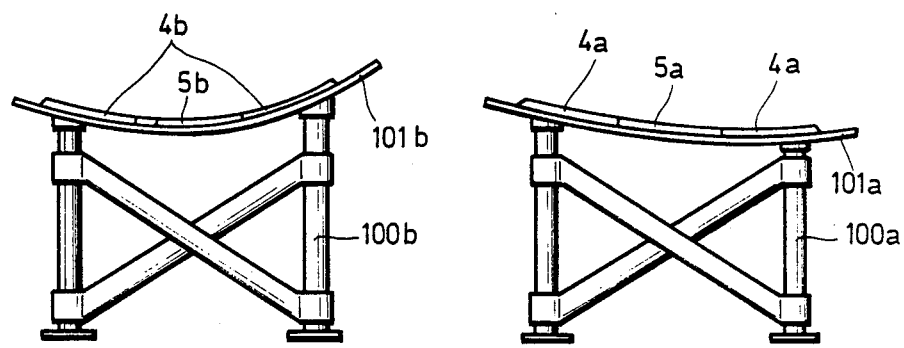
FIGS. 2a, 2b, and 2c show various steps in the molding of the parts of the spar section of the airfoil, with the assembly of the parts of the spar section being shown in FIG. 2c.
Figure 2B:
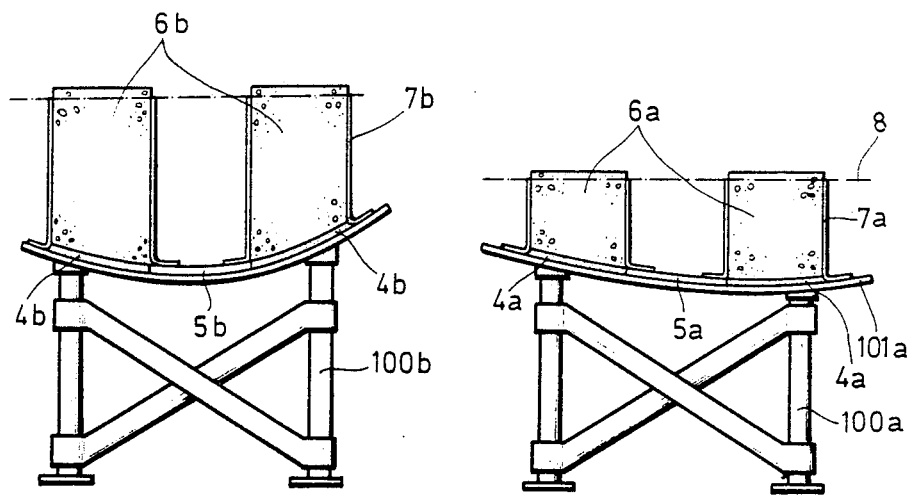
Figure 2C:
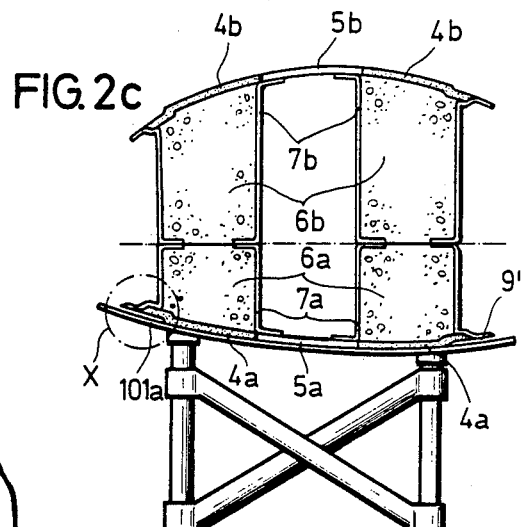

FIGS. 2a, 2b, and 2c depict the method of manufacture of the spar section 1 of the airfoil depicted in FIG. 1. In FIG. 2a there is shown a pair of mold tables 100a and 100b. As noted in FIG. 1, the spar section 1 is divided along a longitudinally extending junction plane 8. An upper part of the spar section 1 is located above the junction plane 8 and comprises reinforcing bar laminates 7b, flange laminates 4b, and a thrust transmitting laminate 5b.

Located below the junction plane 8 is the lower part of the spar section 1 which similarly comprises reinforcing bar laminates 7a, flange laminates 4a, and a thrust transmitting laminate 5a.

The upper part of the spar section 1 is formed in the mold table 100b and the lower part of the spar section 1 is formed in the mold table 100a. The mold table 100b includes a mold shell 101b which is shaped in the form of the part of the aerodynamic profile of the upper surface of the airfoil shown in FIG. 1 which is occupied by the spar section 1. Thus, the upper part of the spar section 1 is formed in the mold 100b with an outer shape which defines a part of the upper surface of the aerodynamic profile of the airfoil occupied by the spar section 1.

Similarly, the mold table 100a is formed with a mold shell 101a which is shaped in the form of the part of the lower surface of the aerodynamic profile of the airfoil which is occupied by the spar section 1.

Thus, in the mold tables 101a and 101b the lower and upper parts of the spar section 1 will be formed to define, respectively, parts of the aerodynamic profile of the airfoil so that when the upper and lower parts are joined together, the spar section 1 will be formed in the shape of the aerodynamic profile of the airfoil.

In FIG. 2a, the mold table 100b is arranged with the flange laminates 4b located on either side of the thrust transmitting laminates 5b. Similarly, the mold table 100a is formed with flange laminates 4a on either side of the thrust transmitting laminates 5a. The flange laminates 4a and 4b are inserted in the longitudinal direction of the rotor blade and also the thrust transmitting laminates 5a and 5b are inserted in the mold shell 101a and 101b. Particularly, manual laminating the "prepreg" process and the vacuum injection process are suitable to manufacture the laminates.

As shown in FIG. 2b, two approximately cut halves of foam bar units 6a and 6b are, after haidening, glued to the associated flange laminates 4a and 4b and they are reinforced preferably at the sides by means of the bar laminates 7a and 7b.

Figure 2D:
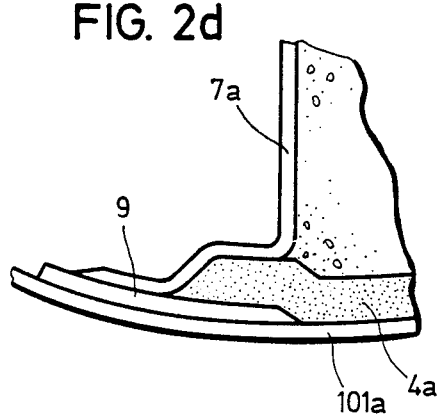
FIG. 2d is a sectional view showing a detail of a part of the spar section shown in FIG. 2c.

The mold shells 100a and 100b may be thickened at the lateral edges of the spar section 1 (compare FIGS. 2c and 2d) with a strip 9 in such a manner that a passage is provided for attachment on one side of the leading section 2 and for attachment on the other side of the trailing section 3.

Projecting foam bar portions are cut off along the junction plane 8 in order to compensate for manufacturing tolerances as well as mold inaccuracies in the spar section 1 as well as in the leading section 2 (compare FIG. 2b).

Subsequently, one part of the spar section shown at the left in FIGS. 2a and 2b is released from the mold and is glued at the junction plane 8 to the counterpart of the spar section so that the completed spar section 1 may be formed which, in its outer contours, will correspond directly to the profile of the airfoil. Thus, unlike prior techniques, the wing profile in accordance with the present invention is structured in a manner which does not require the utilization of additional casings.

Figure 3:
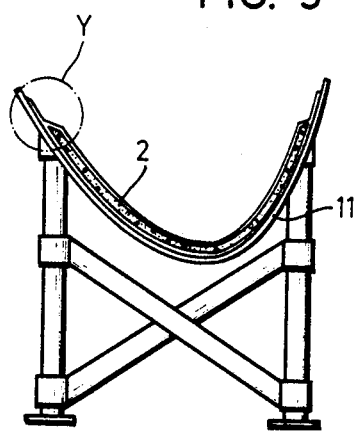
FIG. 3 is a side view of mold apparatus for manufacturing the leading section of the airfoil.
Figure 3A:
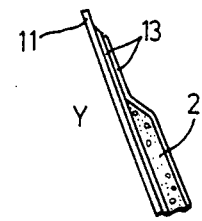
FIG. 3a is a sectional view showing a detail of the structure shown in FIG. 3.

FIG. 3 shows a mold apparatus 11 for manufacture of the nose shell or leading section 2 of the airfoil. The section 2 is manufactured in the mold 11 or in several molds by means of a laminating process known in the art. Preferably, a light laminar structure is built so that a shell results which will have good inherent stiffness. The edges are constructed as thin laminated layers 13 which, during assembly with the spar section 1, will serve as elastic extensions which can compensate for minor inaccuracies.

Figure 4:
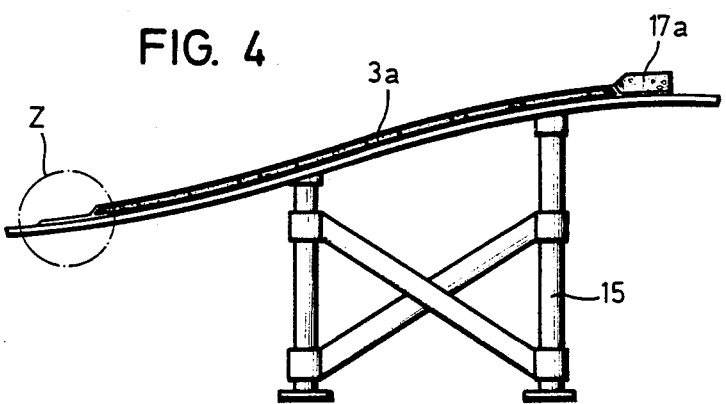
FIG. 4 is a side view showing molding apparatus for manufacturing the trailing section of the airfoil.
Figure 4A:
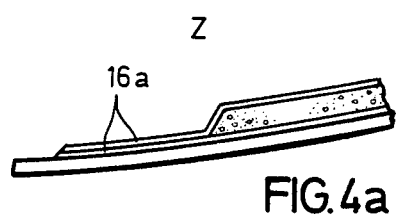
FIG. 4a is a sectional view showing in detail the structure shown in FIG. 4.

In FIG. 4 there is shown mold apparatus 15 for forming the vane section or trailing section 3 of the airfoil. The trailing section 3 is preferably manufactured as a light laminar structure in separate molds 15 for the upper side and the lower side. The trailing section also is provided with elastic extensions 16a and 16b at the sides thereof which may be connected with the spar section 1. If desired, from the point of view of the shaping of the section, a thick section end edge can be achieved by gluing on a foam strip 17a or 17b.

Figure 5A:
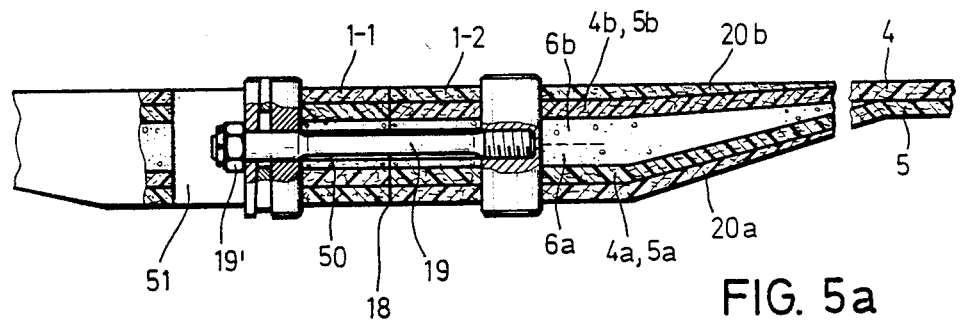
FIG. 5a is a sectional view showing a division of the rotor blade of the airfoil of FIG. 1 into individual segments in the longitudinal direction of the blade.
Figure 5B:
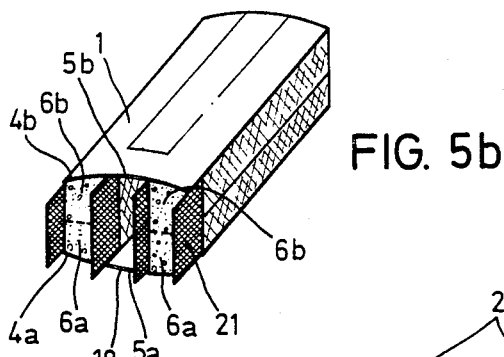
FIG. 5b is a perspective view showing the spar section of the airfoil.

FIGS. 5a and 5b show the division of the spar section 1 into modules 1-1 and 1-2 in the longitudinal direction of the rotor blade. The laminates 4a, 5a and 4b, 5b near the disconnecting points 18 are thickened by means of additional laminates 20a and 20b. These thick laminates receive, in a manner known in the art, longitudinal bores 50 and transverse bores 51 to receive connecting elements 19 and 19'.

With the spar segments 1-1 and 1-2 assembled, the connecting elements 19 and 19' are inserted and prestressed. After this assembly, the laminates 21 are applied as transverse force connections.

Figure 6:
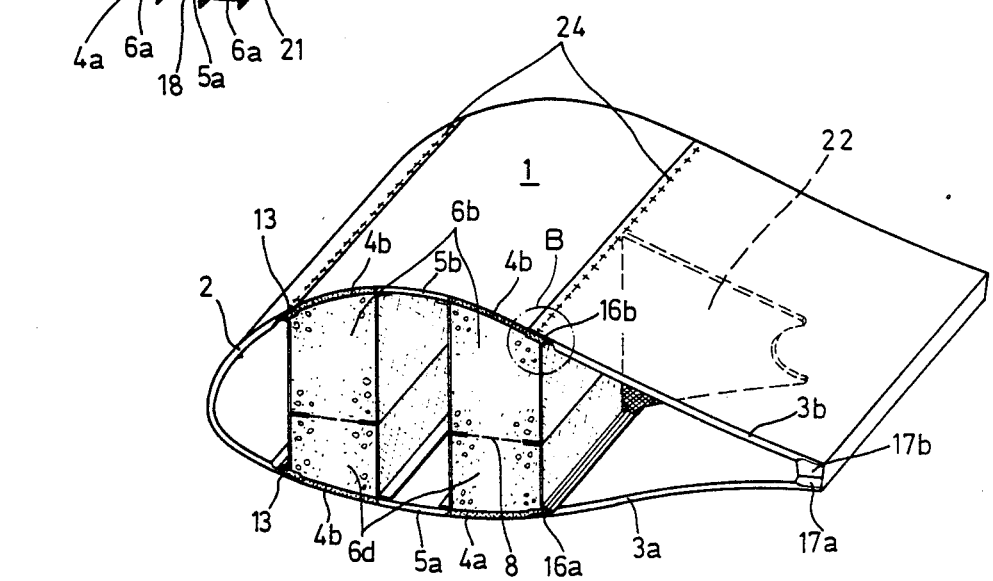
FIG. 6 is a perspective view showing the assembled sections of the airfoil.

FIG. 6 depicts the overall assembly of the spar section 1 together with the leading section 2 and the trailing section 3. The individual modules of the airfoil of the present invention may be separately transported and assembled on site at, for example, the location of a wind-driven power plant.

Figure 6A:
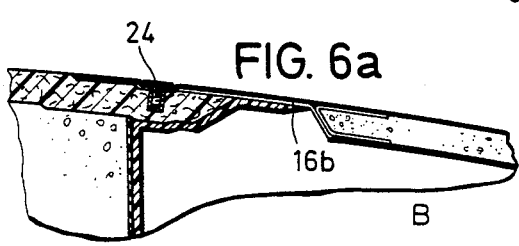
FIG. 6a is a sectional view showing a detail of the structure of the assembled airfoil.

In the assembly procedure, trailing section halves 3a and 3b are glued together at an end edge thereof, i.e., at the foam strips 17a and 17b, and they are connected with the spar section 1 by means of glued connections 25 and screw connections 24 (see FIG. 6a). Ribs 22 assist in the positioning of the elements and they are glued as reinforcements to the trailing section halves 3a and 3b and to the spar section 1.

The leading section 2 is also glued to the spar section 1 and is attached with screwed or threaded elements similar to the screw connections 24 shown in FIG. 6a. The screw connections 24 impart to the glued connections necessary contact pressure and thus will prevent peeling.

Figure 7:
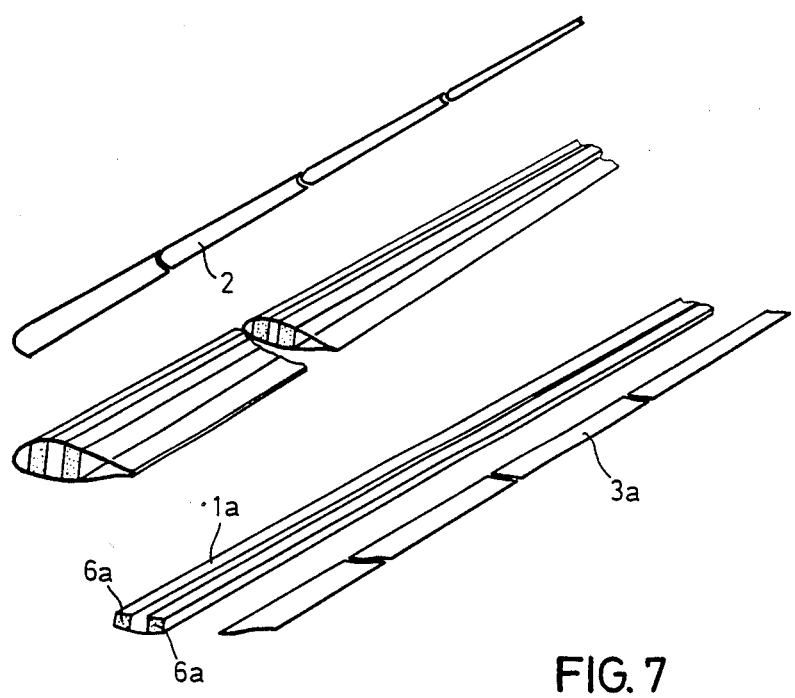
FIG. 7 is a perspective view, partially in section, showing a portion of a rotor blade in accordance with the invention.

Shown in an exploded view in FIG. 7 is a completed rotor blade depicted insofar as it is built in accordance with the invention, i.e., without the rotor head and without the blade tip as well as possibly a directly adjoining rotor blade section, and the blade shown in FIG. 7 may be manufactured completely of foam. As indicated in FIG. 7, the lower part of the spar section is identified with reference numeral 1a.

While a specific embodiment of the invention has been shown and described in detail to illustrate the application of the inventive principles, it will be understood that the invention may be embodied otherwise without departing from such principles.

What is claimed is:

1. A large wind-driven power plant having a rotor blade with an airfoil structure having an upper airfoil surface and a lower airfoil surface comprising:

three modular sections consisting essentially of a leading section defining a leading edge of said airfoil, a trailing section defining a trailing edge of said airfoil, and a spar section immediate said leading and trailing sections;

said modular sections being separately formed and subsequently assembled together to form said airfoil structure;

said spar section being formed to consist essentially of an upper airfoil skin segment defining a part of said upper airfoil surface, a lower airfoil skin segment defining a part of said lower airfoil surface, said parts of said upper and lower airfoil surfaces extending along the section of said airfoil structure defined by said spar section and a spar including upper and lower laminate layers and at least one foam bar unit extending completely between and supporting said laminmate layers;

said laminate layers each consisting essentially of laminate material having a unidirectional fiber orientation and laminate material having a thrust transmitting fiber orientation connected to said laminate material having unidirectional fiber orientation;

said foam bar unit being connected between and supporting said laminate material having a unidirectional fiber orientation;

said laminate layers of said spar forming said upper and lower airfoil skin segments.

2. An airfoil according to claim 1, wherein said leading section is formed as a laminate.

3. An airfoil according to claim 2, wherein said laminate comprises a light laminar structure.

4. An airfoil according to claim 2 or 3, wherein said leading section terminates with elastic extensions.

5. An airfoil according to claim 1, wherein said leading section is connected with said spar section by means of screw connections and/or glued connections.

6. An airfoil according to claim 1, comprising a plurality of foam bar units extending completely between said upper and lower airfoil surfaces, said foam bar units being spaced apart taken in a direction from said leading portion to said trailing portion of said airfoil.

7. An airfoil according to claim 1, wherein each foam bar unit comprises an upper foam bar connected to said upper laminate layer and a lower foam bar connected to said lower laminate layer, said upper and lower foam bars being joined to each other along planar surfaces thereof, which are parallel to an imaginary plane extending between said leading and said trailing edges of said airfoil structure.

* * * * *